(12) United States Patent
Donnell et al.

(10) Patent No.: US 11,790,018 B1
(45) Date of Patent: Oct. 17, 2023

(54) APPARATUS FOR ATTRIBUTE TRAVERSAL

(71) Applicant: Gravystack, Inc., Phoenix, AZ (US)

(72) Inventors: Scott Donnell, Phoenix, AZ (US);
Travis Adams, Phoenix, AZ (US);
Chad Willardson, Phoenix, AZ (US)

(73) Assignee: Gravystack, Inc., Phoenix, AZ (US)

( * ) Notice: Subject to any disclaimer, the term of this patent is extended or adjusted under 35 U.S.C. 154(b) by 0 days.

(21) Appl. No.: 17/872,182

(22) Filed: Jul. 25, 2022

(51) Int. Cl.
*G06F 16/951* (2019.01)
*G06F 16/9532* (2019.01)

(52) U.S. Cl.
CPC ........ *G06F 16/951* (2019.01); *G06F 16/9532* (2019.01)

(58) Field of Classification Search
CPC .......................... G06F 16/951; G06F 16/9532
USPC ............................................................. 707/797
See application file for complete search history.

(56) References Cited

U.S. PATENT DOCUMENTS

| | | | | |
|---|---|---|---|---|
| 8,311,863 | B1* | 11/2012 | Kemp | G06Q 10/0639 705/7.29 |
| 8,639,633 | B2* | 1/2014 | Schneider | G06Q 10/063112 705/321 |
| 10,320,569 | B1* | 6/2019 | Wentz | H04L 9/3239 |
| 10,691,726 | B2* | 6/2020 | Rapaport | G06Q 30/02 |
| 10,855,619 | B1* | 12/2020 | Andrews | H04L 63/20 |
| 10,956,723 | B2* | 3/2021 | Marty | G06V 20/42 |
| 11,071,495 | B2* | 7/2021 | Okada | G06N 3/08 |
| 11,416,821 | B1* | 8/2022 | Stewart | G06F 21/602 |
| 11,475,141 | B1* | 10/2022 | Stewart | G06Q 50/10 |
| 11,495,338 | B1* | 11/2022 | Sternlicht | G16H 50/20 |
| 11,507,901 | B1* | 11/2022 | Stewart | G06Q 10/063112 |
| 11,558,580 | B1* | 1/2023 | Stewart | H04N 5/91 |
| 11,562,032 | B1* | 1/2023 | Stewart | G06Q 50/01 |
| 2003/0152902 | A1* | 8/2003 | Altenhofen | G09B 7/00 434/350 |
| 2008/0318197 | A1* | 12/2008 | Dion | G09B 7/00 434/365 |
| 2011/0276507 | A1* | 11/2011 | O'Malley | G06Q 10/00 705/321 |
| 2016/0246945 | A1* | 8/2016 | Allen | G16H 20/40 |
| 2018/0143995 | A1* | 5/2018 | Bailey | G06F 21/6218 |
| 2018/0322337 | A1* | 11/2018 | Marty | G06T 7/20 |
| 2018/0350015 | A1* | 12/2018 | Gordon | G09B 7/00 |
| 2019/0312734 | A1* | 10/2019 | Wentz | H04L 9/0877 |
| 2019/0329114 | A1* | 10/2019 | Marty | A63B 24/0021 |
| 2019/0332931 | A1* | 10/2019 | Montantes | G06F 40/40 |
| 2020/0027052 | A1* | 1/2020 | Aiyer | G06Q 10/063112 |
| 2020/0153635 | A1* | 5/2020 | Serres | H04L 9/32 |
| 2020/0162268 | A1* | 5/2020 | Wentz | H04L 9/50 |
| 2020/0304632 | A1* | 9/2020 | Johnson | H04L 9/0637 |

(Continued)

*Primary Examiner* — Mark E Hershley
(74) *Attorney, Agent, or Firm* — CALDWELL INTELLECTUAL PROPERTY LAW

(57) ABSTRACT

In an aspect, an apparatus for attribute traversal is presented. An apparatus includes at least a processor and a memory communicatively connected to the at least a processor. A memory contains instructions configuring at least a processor to receive user data. At least a processor configured to identify a plurality of attributes of user data. At least a processor is configured to calculate a proficiency score. At least a processor is configured to generate a utility function. At least a processor is configured to determine an attribute enhancement datum. At least a processor is configured to present an attribute enhancement datum to a user.

20 Claims, 7 Drawing Sheets

(56) References Cited

U.S. PATENT DOCUMENTS

| | | | | |
|---|---|---|---|---|
| 2021/0082300 | A1* | 3/2021 | Silverstein | G06F 3/011 |
| 2021/0133329 | A1* | 5/2021 | Andrews | G06F 21/577 |
| 2021/0265038 | A1* | 8/2021 | Simon | G16H 20/70 |
| 2021/0350274 | A1* | 11/2021 | Pfitzmann | G06F 11/3409 |
| 2021/0382515 | A1* | 12/2021 | Dubrovsky | G06N 10/00 |
| 2022/0057519 | A1* | 2/2022 | Goldstein | G01S 17/04 |
| 2022/0198298 | A1* | 6/2022 | Chow | G06Q 10/10 |
| 2022/0310253 | A1* | 9/2022 | Ferro, Jr. | G06T 19/006 |
| 2022/0318600 | A1* | 10/2022 | Mahna | G06N 7/01 |
| 2022/0358241 | A1* | 11/2022 | Palakodety | G16H 15/00 |
| 2022/0358406 | A1* | 11/2022 | Strand | G06N 7/01 |
| 2022/0374412 | A1* | 11/2022 | Barnitt | G06F 3/04842 |
| 2023/0095036 | A1* | 3/2023 | Tripuraneni | G06Q 10/06398 705/7.42 |

\* cited by examiner

APPARATUS FOR ATTRIBUTE TRAVERSAL

FIELD OF THE INVENTION

The present invention generally relates to the field of attribute traversal. In particular, the present invention is directed to an apparatus for attribute traversal.

BACKGROUND

Improving one or more attributes can be inefficient and unclear. As such, modern apparatuses and methods for attribute traversal can be improved.

SUMMARY OF THE DISCLOSURE

In an aspect, an apparatus for attribute traversal is presented. An apparatus includes at least a processor and a memory communicatively connected to the at least a processor. A memory contains instructions configuring at least a processor to receive user data. At least a processor configured to identify a plurality of attributes of user data. At least a processor is configured to calculate a proficiency score. At least a processor is configured to generate a utility function. At least a processor is configured to determine an attribute enhancement datum. At least a processor is configured to present an attribute enhancement datum to a user.

In another aspect, a method of attribute traversal is presented. A method includes receiving user data. A method includes identifying a plurality of attributes of user data. A method includes calculating a proficiency score. A method includes generating a utility function. A method includes determining an attribute enchantment datum. A method includes presenting an attribute enhancement datum to a user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods of attribute traversal. In an embodiment, an apparatus may be configured to identify an attribute of user data.

Aspects of the present disclosure can be used to provide an attribute enhancement datum to a user. Aspects of the present disclosure can also be used to generate classifications of attributes.

Aspects of the present disclosure allow for attribute ranking. Exemplary embodiments illustrating aspects of the present disclosure are described below in the context of several specific examples.

Figure 1:
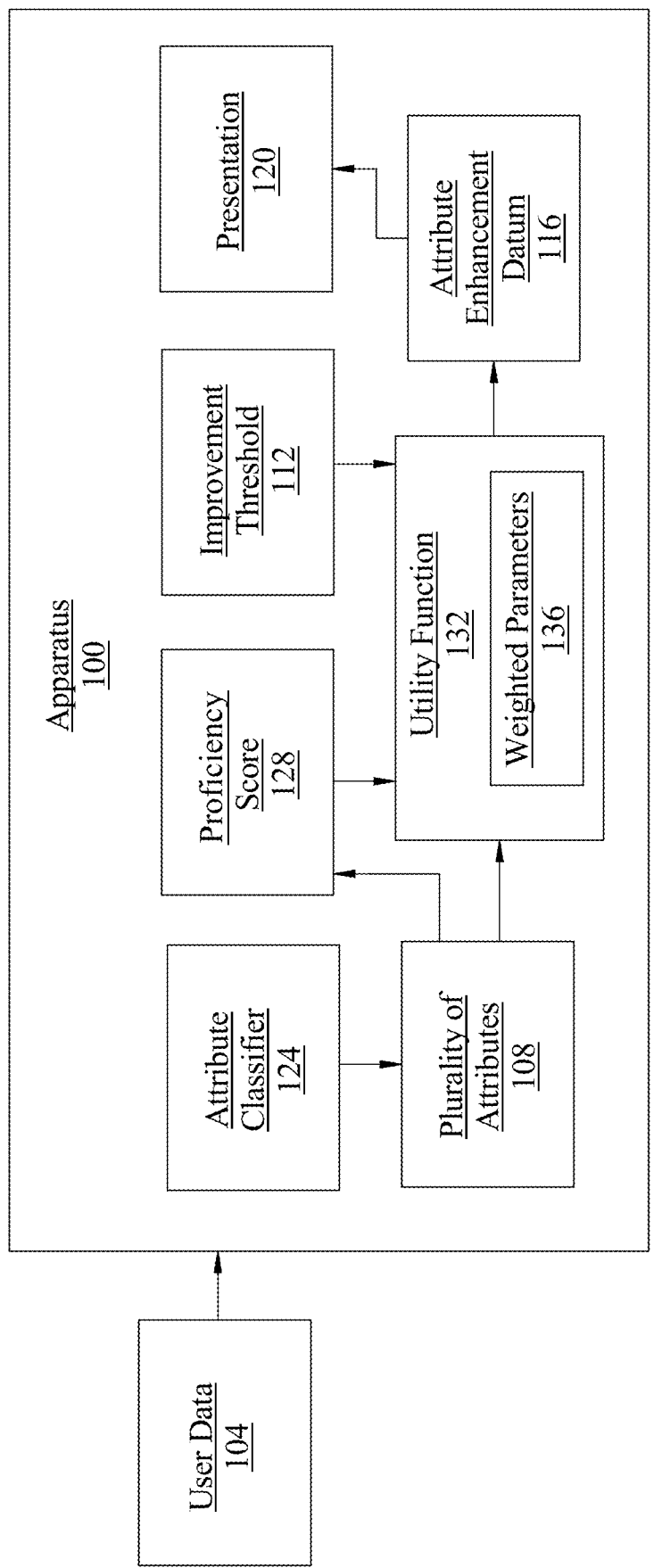
FIG. 1 is an exemplary embodiment of a block diagram of an apparatus for attribute traversal.

Referring now to FIG. 1, an exemplary embodiment of an apparatus 100 for attribute traversal is illustrated. Apparatus 100 may include at least a processor and a memory communicatively connected to the at least a processor. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, a memory may contain instructions that may configured at least a processor to perform various tasks. Instructions may be received from user input, external computing devices, and the like. Apparatus 100 may include any computing device as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or apparatus 100. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented using a "shared nothing" architecture in which data is cached at the worker, in an embodiment, this may enable scalability of apparatus 100 and/or a computing device.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 may be configured to receive user data 104. "User data" as used in this disclosure is information pertaining to an individual. User data 104 may include, without limitation, hobby data, employment data, goal data, assessment data, performance data, and the like. User data 104 may be transmitted to apparatus 100 from one or more external computing devices. In some embodiments, apparatus 100 may receive user data 104 through user input. In some embodiments, apparatus 100 may receive user data 104 through one or more sensors in communication with apparatus 100. A "sensor" as used in this disclosure is a device that measure natural phenomenon. Natural phenomenon may include, but is not limited to, forces, optics, audio, temperatures, and the like. A sensor may include, without limitation, one or more cameras, microphones, and the like. In some embodiments, user data 104 may include video data. "Video data" as used in this disclosure is information relating to optical and/or audio recordings. In some embodiments, video data may include, but is not limited to, video recordings of a user. In some embodiments, user data 104 may include written data. "Written data" as used in this disclosure is information conveyed through characters, symbols, markings, and the like. Written data may include words and/or phrases. In some embodiments, user data 104 may include, but is not limited to, exams, quizzes, writing samples, and the like.

Still refereeing to FIG. 1, apparatus 100 may utilize an optical character recognition process to determine content of written data of user data 104. In some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 3. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, Calif., United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori data describing grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, in some embodiments, user data 104 may include audio data. "Audio data" as used in this disclosure is information relating to soundwaves. Audio data may include, but is not limited to, speech, vocalizations, environmental noise, and the like. In some embodiments, apparatus 100 may receive user data 104 through a microphone. As used in this disclosure, a "microphone" is any transducer configured to transduce pressure change phenomenon to a signal, for instance a signal representative of a parameter associated with the phenomenon. A microphone, according to some embodiments, may include a transducer configured to convert sound into electrical signal. Exemplary non-limiting microphones include dynamic microphones (which may include a coil of wire suspended in a magnetic field), condenser microphones (which may include a vibrating diaphragm condensing plate), and a contact (or conductance) microphone (which may include piezoelectric crystal material). A microphone may include any microphone for transducing pressure changes, as described above; therefore, microphone may include any variety of microphone, including any of: condenser microphones, electret microphones, dynamic microphones, ribbon microphones, carbon microphones, piezoelectric microphones, fiber-optic microphones, laser microphones, liquid microphones, microelectromechanical systems (MEMS) microphones, and/or a speaker microphone.

Still referring to FIG. 1, in some embodiments, apparatus 100 may receive audio data of user data 104 in a form of an audio signal. An "audio signal," as used in this disclosure, is a representation of sound. In some cases, an audio signal may include an analog electrical signal of time-varying electrical potential. In some embodiments, an audio signal may be communicated (e.g., transmitted and/or received) by way of an electrically transmissive path (e.g., conductive wire), for instance an audio signal path. Alternatively or additionally, audio signal may include a digital signal of time-varying digital numbers. In some cases, a digital audio signal may be communicated (e.g., transmitted and/or received) by way of any of an optical fiber, at least an electrically transmissive path, and the like. In some cases, a line code and/or a communication protocol may be used to aid in communication of a digital audio signal. Exemplary digital audio transports include, without limitation, Alesis Digital Audio Tape (ADAT), Tascam Digital Interface (TDIF), Toshiba Link (TOSLINK), Sony/Philips Digital Interface (S/PDIF), Audio Engineering Society standard 3 (AES3), Multichannel Audio Digital Interface (MADI), Musical Instrument Digital Interface (MIDI), audio over Ethernet, and audio over IP. Audio signals may represent frequencies within an audible range corresponding to ordinary limits of human hearing, for example substantially between about 20 and about 20,000 Hz. According to some embodiments, an audio signal may include one or more parameters, such as without limitation bandwidth, nominal level, power level (e.g., in decibels), and potential level (e.g., in volts). In some cases, relationship between power and potential for an audio signal may be related to an impedance of a signal path of the audio signal. In some cases, a signal path may single-ended or balanced.

With continued reference to FIG. 1, a microphone may be configured to transduce an environmental noise to an environmental noise signal. In some cases, environmental noise may include any of background noise, ambient noise, aural noise, such as noise heard by a user's ear, and the like. Additionally or alternatively, in some embodiments, environmental noise may include any noise present in an environment, such as without limitation an environment surrounding, proximal to, or of interest/disinterest to a user. An environmental noise may, in some cases, include substantially continuous noises, such as a drone of an engine. Alternatively or additionally, in some cases, environmental noise may include substantially non-continuous noises, such as spoken communication or a backfire of an engine. An environmental noise signal may include any type of signal, for instance types of signals described in this disclosure. For instance, an environmental noise signal may include a digital signal or an analog signal.

Still referring to FIG. 1, in some embodiments, automatic speech recognition may require training (i.e., enrollment). In some cases, training an automatic speech recognition model may require an individual speaker to read text or isolated vocabulary. In some cases, a solicitation video may include an audio component having an audible verbal content. Apparatus 100 may then train an automatic speech recognition model according to training data which includes audible verbal content correlated to known content. In this way, apparatus 100 may analyze a person's specific voice and train an automatic speech recognition model to the person's speech, resulting in increased accuracy. Alternatively or additionally, in some cases, apparatus 100 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, apparatus 100 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMIs) may include statistical models that output a sequence of symbols or quantities. HMIs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow computing device 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Still referring to FIG. 1, in some embodiments, apparatus 100 may be configured to determine plurality of attributes 108 from user data 104. An "attribute" as used in this disclosure is a trait and/or skill of an entity. Attributes may include, without limitation, writing skills. "Writing skills" as used throughout this disclosure are techniques of employing written language. Writing skills may include, but are not limited to, grammar, vernacular, coherency, conciseness, creativity, spelling, and the like. In some embodiments, an attribute of plurality of attributes 108 may include technical knowledge. "Technical knowledge" as used in this disclosure is information relating to a specific knowledge field. A knowledge field may include, but is not limited to, carpentry, cutlery, electrical engineering, mechanical engineering, physics, chemistry, computer science, history, geography, land vehicles, air vehicles, water vehicles, and the like. In some embodiments, an attribute of plurality of attributes 108 may include vocational skills. "Vocational skills" as used throughout this disclosure are abilities relating to speaking. Abilities relating to speaking may include, but are not limited to, pronunciation, enunciation, public speaking skills, and the like. In some embodiments, an attribute of plurality of attributes 108 may include, without limitation, athletic skills. "Athletic skills" as used throughout this disclosure is the ability to perform sport movement. Sports movements may include, but are not limited to, sprinting, powerlifting, dancing, skating, throwing, jumping, and the like.

Still referring to FIG. 1, in some embodiments, apparatus 100 may classify one or more attributes of plurality of attributes 108. Classification may include utilizing attribute classifier 124. An "attribute classifier" as used in this disclosure is a process that categorizes user data to one or more attribute categories. Attribute classifier 124 may include any machine learning process and/or classification model as described throughout this disclosure, without limitation. Attribute classifier 124 may be trained with training data correlating attributes to one or more attribute categories. Training data may be received from external computing devices, user input, and/or previous iterations of processing. Attribute classifier 124 may be configured to input one or more attributes and output classifications of one or more attributes to one or more attributes categories, such as, but not limited to, vocal skills, writing skills, athletic skills, technical knowledge, and the like. Apparatus 100 may classify plurality of attributes 108 to categories such as, but not limited to, athletics, vocal skills, technical knowledge, time management skills, financial responsibility, writing skills, and the like.

Still referring to FIG. 1, in some embodiments, apparatus 100 may be configured to determine proficiency score 128 of an attribute of plurality of attributes 108. A "proficiency score" as used in this disclosure is a level of competence of a skill. Proficiency score 128 may include, but is not limited to, beginner, intermediate, average, advanced, superior, and/or expert. Apparatus 100 may determine a baseline proficiency score to compare an attribute of plurality of attributes 108 to. A "baseline proficiency score" as used in this disclosure is an initial level of skill. Baseline proficiency scores may include, but are not limited to, beginner, intermediate, average, advanced, superior, and/or expert. Apparatus 100 may determine one or more baseline proficiency scores through extrapolating data from one or more web searches. In some embodiments, apparatus 100 may determine a baseline proficiency score of an attribute of plurality of attributes 108 through analyzing user data 104 over a period of time. For instance and without limitation, apparatus 100 may receive user data 104 which may include mathematic exams. An attribute of plurality of attributes 108 may include math skills. Apparatus 100 may determine a baseline proficiency score of math skills of plurality of attributes 108 through analyzing mathematic exams of user data 104. In other embodiments, a baseline proficiency score may be received from an external computing device, user input, and/or other forms of communication. In some embodiments, apparatus 100 may utilize a baseline machine learning model. A baseline machine learning model may be trained with training data correlating user data to proficiency scores. Training data may be received from user input, external computing devices, and/or previous iterations of processing. A baseline machine learning model may be configured to input user data 104 and output one or more baseline proficiencies of user data 104. For instance and without limitation, a baseline machine learning model may input user data 104 and output baseline proficiencies of average, excellent, and the like.

Still referring to FIG. 1, in some embodiments, apparatus 100 may be configured to rank an attribute of plurality of attributes 108 as a function of a ranking criterion. A "ranking criterion" as used in this disclosure is a value or values that determine a priority of one or more elements. A ranking criterion may include, but is not limited to, whole numbers, percentages, decimal values, and the like. Apparatus 100 may determine a ranking criterion based on proficiency score 128 of one or more attributes of plurality of attributes 108. For instance and without limitation, apparatus 100 may rank plurality of attributes 108 in order of least proficient to most proficient. In other embodiments, apparatus 100 may rank plurality of attributes 108 in order of most proficient to least proficient, without limitation.

Still referring to FIG. 1, in some embodiments, apparatus 100 may generate utility function 132. A "utility function" as used in this disclosure is a computer process that calculates relative importance of one or more attributes. A "relative importance" as used in this disclosure is a degree of priority of one or more elements. Utility function 132 may input attribute data of one or more attributes of plurality of attributes 108 and output rankings, priorities, and/or attribute enhancement datum 116. In some embodiments, utility function 132 may include weighted parameters 136. "Weighted parameters" as used in this disclosures are values having a degree of importance of one or more elements. Weighted parameters 136 may include, but are not limited to, proficiency score 128 values associated with an attribute and/or plurality of attributes 108, differences between a baseline proficiency score and proficiency score 128 of one or more attributes of plurality of attributes 108, user inputted priority values, and the like. In some embodiments, apparatus 100 and/or utility function 132 may generated weighted parameters 136 as a function of proficiency score 128 and/or user data 104. Utility function 132 may determine a lowest proficiency score 128 of an attribute of plurality of attributes 108, a highest proficiency score 128 of an attribute of plurality of attributes 108, and/or an attribute that may maximize a utility of a user. A "utility" as used in this disclosure is a functionality of one or more elements. A utility may include, but is not limited to, speech skills, language skills, math skills, coding skills, athletic skills, and the like. For instance and without limitation, utility function 132 may input plurality of attributes 108 having an attribute of writing skills, math skills, and communication skills. Utility function 132 may determine improving an attribute of writing skills may maximize a utility of poetry skills. Utility function 132 may include any optimization function, machine learning model, and/or classifier as used throughout this disclosure, without limitation.

Still referring to FIG. 1, in some embodiments, apparatus 100 may generate improvement threshold 112. An "improvement threshold" as used in this disclosure is a value or range of values that if reached determine a need for advancement in one or more attributes. Improvement threshold 112 may include, but is not limited to, ranges from 0-1, 1-10, 1-100, and the like. In some embodiments, improvement threshold 112 may include, but is not limited to, percentages, ratios, and/or other metrics. Apparatus 100 may determine improvement threshold 112 as a function of one or more proficiency and/or rankings of plurality of attributes 108. Improvement threshold 112 may determine a degree of improvement of one or more attributes of plurality of attributes 108. A "degree of improvement" as used in this disclosure is a measure of how much an attribute proficiency may be improved. For instance and without limitation, a degree of improvement may include low, medium, high, extra high, and the like. In some embodiments, utility function 132 may calculate improvement threshold 112. In other embodiments, apparatus 100 may calculate improvement threshold 112 and input improvement threshold 112 to utility function 132.

Still referring to FIG. 1, apparatus 100 may determine improvement threshold 112 through generating a web index query. A "query" as used in this disclosure is a search function that returns data. Apparatus 100 may generate a query to search through databases for similar attributes. A query may include querying criteria. "Querying criteria" as used in this disclosure are parameters that constrain a search. Querying criteria may include, but is not limited to, attribute similarity, attribute category, freshness, and the like. Querying criteria may be tuned by a machine learning model, such as a machine learning model described below in FIG. 3.

Still referring to FIG. 1, a query may include a web crawler function. A query may be configured to search for one or more keywords, key phrases, and the like. A keyword may be used by a query to filter potential results from a query. As a non-limiting example, a keyword may include "kinetics". A query may be configured to generate one or more key words and/or phrases as a function of plurality of attributes 108. A query may give a weight to one or more attributes of plurality of attributes 108. "Weights", as used herein, may be multipliers or other scalar numbers reflecting a relative importance of a particular attribute or value. A weight may include, but is not limited to, a numerical value corresponding to an importance of an element. In some embodiments, a weighted value may be referred to in terms of a whole number, such as 1, 100, and the like. As a non-limiting example, a weighted value of 0.2 may indicated that the weighted value makes up 20% of the total value. In some embodiments, a query may pair one or more weighted values to one or more attributes of plurality of attributes 108. Weighted values may be tuned through a machine-learning model, such as any machine learning model described throughout this disclosure, without limitation. In some embodiments, a query may generate weighted values based on prior queries. In some embodiments, a query may be configured to filter out one or more "stop words" that may not convey meaning, such as "of," "a," "an," "the," or the like.

Still referring to FIG. 1, a query may include a search index. A "search index" as used in this disclosure is a data structure that is configured to compare and/or match data. A search index may be used to link two or more data elements of a database. A search index may enable faster lookup times by linking similar data elements, such as attributes. In some embodiments, apparatus 100 and/or a query may generate an index classifier. In an embodiment, an index classifier may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. An index classifier may include a classifier configured to input attributes and output web search indices. A "web search index," as defined in this disclosure is a data structure that stores uniform resource locators (URLs) of web pages together with one or more associated data that may be used to retrieve URLs by querying the web search index; associated data may include keywords identified in pages associated with URLs by programs such as web crawlers and/or "spiders." A web search index may include any data structure for ordered storage and retrieval of data, which may be implemented as a hardware or software module. A web search index may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a web search index may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a web search index may reflect categories, cohorts, and/or populations of data consistently with this disclosure. In an embodiment, a web search query at a search engine may be submitted as a query to a web search index, which may retrieve a list of URLs responsive to the query. In some embodiments, a computing device may be configured to generate a web search query based on a freshness and/or age of a query result. A freshness may include an accuracy of a query result. An age may include a metric of how outdated a query result may be. In some embodiments, a computing device may generate a web crawler configured to search the Internet for attributes such as, but not limited to, math skills, writing skills, technical knowledge, and the like.

Still referring to FIG. 1, apparatus 100 and/or another device may generate an index classifier using a classification algorithm, defined as a process whereby a computing device derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by a computing device may correlate any input data as described in this disclosure to any output data as described in this disclosure. In some embodiments, training data may include index training data. Index training data, defined as training data used to generate an index classifier, may include, without limitation, a plurality of data entries, each data entry including one or more elements of attribute data such as data of technical background, and one or more correlated improvement thresholds, where improvement thresholds and associated attribute data may be identified using feature learning algorithms as described below. Index training data and/or elements thereof may be added to, as a non-limiting example, by classification of multiple users' attribute data to improvement thresholds using one or more classification algorithms.

Still referring to FIG. 1, apparatus 100 may be configured to generate an index classifier using a Naïve Bayes classification algorithm. A Naïve Bayes classification algorithm generates classifiers by assigning class labels to problem instances, represented as vectors of element values. Class labels may be drawn from a finite set. A Naïve Bayes classification algorithm may include generating a family of algorithms that assume that the value of a particular element is independent of the value of any other element, given a class variable. A Naïve Bayes classification algorithm may be based on Bayes Theorem expressed as P(A/B)=P(B/A) P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A Naïve Bayes algorithm may be generated by first transforming training data into a frequency table. A computing device may then calculate a likelihood table by calculating probabilities of different data entries and classification labels. A computing device may utilize a Naïve Bayes equation to calculate a posterior probability for each class. A class containing the highest posterior probability may be the outcome of prediction. A Naïve Bayes classification algorithm may include a gaussian model that follows a normal distribution. A Naïve Bayes classification algorithm may include a multinomial model that is used for discrete counts. A Naïve Bayes classification algorithm may include a Bernoulli model that may be utilized when vectors are binary.

With continued reference to FIG. 1, apparatus 100 may be configured to generate an index classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating a k-nearest neighbors algorithm may include generating a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting example, K-nearest neighbors algorithm may be configured to classify an input vector including a plurality of attribute data, key words and/or phrases, or the like, to clusters representing themes.

In an embodiment, and still referring to FIG. 1, apparatus 100 may generate new improvement thresholds using a feature learning algorithm. A "feature learning algorithm," as used herein, is a machine-learning algorithm that identifies associations between elements of data in a training data set, where particular outputs and/or inputs are not specified. For instance, and without limitation, a feature learning algorithm may detect co-occurrences of sets of attribute data, as defined above, with each other. As a non-limiting example, a feature learning algorithm may detect co-occurrences of attribute data, as defined above, with each other. Apparatus 100 may perform a feature learning algorithm by dividing attribute data from a given source into various sub-combinations of such data to create attribute data sets as described above, and evaluate which attribute data sets tend to co-occur with which other attribute data sets. In an embodiment, a first feature learning algorithm may perform clustering of data.

Continuing to refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of attribute data with multiple entity skill levels, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, apparatus 100 may generate a k-means clustering algorithm receiving unclassified attribute data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related attribute data, which may be provided with improvement thresholds; this may, for instance, generate an initial set of improvement thresholds from an initial set of attribute data of a large number of users, and may also, upon subsequent iterations, identify new clusters to be provided new improvement threshold to which additional attribute data may be classified, or to which previously used attribute data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $\mathrm{argmin}_{c_i \ni C}$ dist(ci, x)$^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on ci=1/|Si|Σxi∋ Si$^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected attribute data set. Degree of similarity index value may indicate how close a particular combination of attribute data is to being classified by k-means algorithm to a particular cluster. K-means clustering algorithm may evaluate the distances of the combination of attribute data levels to the k-number of clusters output by k-means clustering algorithm. Short distances between a set of attribute data and a cluster may indicate a higher degree of similarity between the set of attribute data and a particular cluster. Longer distances between a set of attribute data and a cluster may indicate a lower degree of similarity between an attribute data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an attribute data set and the data entry cluster. Alternatively or additionally k-means clustering algorithm may select a plurality of clusters having low degree of similarity index values to attribute data sets, indicative of greater degrees of similarity. Degree of similarity index values may be compared to a threshold number indicating a minimal degree of relatedness suitable for inclusion of a set of attribute data in a cluster, where a degree of similarity indices falling under the threshold number may be included as indicative of high degrees of relatedness. Persons skilled in the art, upon reviewing the entirety of this disclosure, will be aware of various additional or alternative feature learning approaches that may be used consistently with this disclosure.

Still referring to FIG. 1, a computing device may be configured to generate an index classifier using thematic training data including a plurality of media items and a plurality of correlated themes. As used herein, a "media item" is an element of content transmitted over a network such as the Internet to be displayed on a user device, which may include any computing device as described in this disclosure. A media item may include, without limitation, an image, a video, an audio file, and/or a textual file. A media item may include an item of a persuasive nature, such as, without limitation, an advertisement. A media item may include a banner advertisement, a "popup" advertisement, a "pop under" advertisement, an advertisement that displays in a layer such as a layer in front of a web page, a redirect advertisement, a "splash screen" advertisement, or the like. A media item may include a "meme," a video forwarded between and/or from social media users, and/or platforms, or the like. A media item may include metadata such as owner, producer, time or place of creation, or the like A media item may include a title. A "theme" of a media item is a subject matter that the media item is promoting, describing, or otherwise providing via its content. A "principal theme" as used in this disclosure is a "main point" or primary purpose of a media item. For instance, in an advertisement, a principal theme of the advertisement may be a product, service, and/or brand being promoted or sold thereby. A principal theme of a video, story, or meme may include a main character, subject matter, place, event, or other main focus of the video, story, or meme.

Still referring to FIG. 1, media training data may be populated by receiving a plurality of user inputs, for instance via graphical user interface forms; as a non-limiting example, each such form may present to a user at least a media item and a user may select a label for each such media item from a list of labels provided to the user and/or may enter one or more words in a text entry element, which may be mapped to labels using language processing as described below; label selected by user may correspond to a user-entered identification of a principal theme of the media item. An index classifier may input media items and output principal themes of the media items.

Continuing to refer to FIG. 1, apparatus 100 may be configured to generate an index classifier using a classification algorithm, which may be implemented, without limitation, using any classification algorithm suitable for generating a vice classifier as described above. As a non-limiting example, an index classifier may use a K-nearest neighbors algorithm that may be configured to classify an input vector including a plurality of attributes of a media item, such as spoken or written text, objects depicted in images, metadata, etc., to clusters representing themes. An index classifier may alternatively or additionally be created using a naïve-Bayes classification algorithm as described above. An index classifier may enable a computing device to identify a single theme represented by the best-matching cluster and/or some number of best-matching clusters, such as the K best matching clusters; in the latter case, matching a theme as described below may include matching any of the K best themes, or the most probable theme may be treated as the main theme and the remaining matching clusters may be treated as identifying themes of secondary importance.

In an embodiment, and continuing to refer to FIG. 1, apparatus 100 may modify media training data, for instance to replace a media item with plurality of objects; plurality of objects may be used as attributes of a vector associated with a media item in media training data, for instance for use in KNN or other classification algorithms as described above. Objects of plurality of objects may include, without limitation, objects depicted in images or frames of media, objects described in textual data extracted from images or text, and/or converted from spoken words in media, or the like. In an embodiment, apparatus 100 may be configured to extract, from each media item, a plurality of content elements, such as without limitation geometric forms extracted from images and/or video frames, words or phrases of textual data, or the like. Apparatus 100 may be configured to classify each content element of the plurality of content elements to an object of a plurality of objects using an object classifier, where the object classifier may be generated using any classification algorithm as described above. An object classifier may classify words, phrases, and/or geometrical forms to clusters corresponding to labels of objects, enabling a vector representing presence or relative frequency of objects to be created, for instance by populating a vector index corresponding to each of a list of objects with a number indicating presence or absence of an object corresponding to an index and/or a number indicating a number of occurrences of an object corresponding to an index. In the latter case, as a non-limiting example, a higher number may indicate a greater prevalence of a given object in the media item, which may, as a non-limiting example, cause an index classifier to classify the media item to a theme consistent with a higher prevalence of a given object; prevalence and/or relative frequency of an object in media item may also be used, as described below, to determine a degree to which the object is presented in the media item for additional processing. In an embodiment, apparatus 100 may replace media item with a plurality of objects as described above in media training data; for instance, a separate instance of media training data in which media items are replaced with plurality of objects may be generated, permitting use thereof in place of the original media training data. Where object classifier is updated, for instance by adding to a list of objects corresponding to clusters and rerunning object classifier to classify to the updated list, media items stored in memory may be subjected to object classifier again to update each plurality of objects; each of these actions, including without limitation rerunning object classifier to classify to the updated list and/or updating plurality of objects, may be performed by a computing device. An index classifier may likewise be updated by rerunning classification algorithms on updated media training data.

Still referring to FIG. 1, an object classifier and/or classifiers may be run against one or more sets of object training data, where object training data may include any form of object training data as described above. Object training data may include, without limitation, a plurality of data entries, each data entry including one or more content elements and one or more objects represented thereby. Object training data and/or elements thereof may be entered by users, for instance via graphical user interface forms; as a non-limiting example, each such form may present to a user a geometric form, word, image, or the like, and a user may select a label for each such geometric form, word, image, or the like from a list of labels provided to the user and/or may enter one or more words in a text entry element, which may be mapped to labels using language processing as described below.

With continued reference to FIG. 1, apparatus 100 may be configured to classify geometric forms identified in images and/or video frames to objects using a visual object classifier; that is, an object classifier may include a visual object classifier. A visual object classifier may include any classifier described above; a visual object classifier may generate an output classifying a geometric form in a photograph to an object according to any classification algorithm as described above. In an embodiment, a computing device may train a visual object classifier using an image classification training set, which may, as a non-limiting example, include geometric forms extracted from photographs and identifications of one or more objects associated therewith. Image classification training set may, for instance, be populated by user entries of photographs, other images of objects, and/or geometric representations along with corresponding user entries identifying and/labeling objects as described above. A computing device may identify objects in the form of geometrical figures in the photographs as described above, and create training data entries in a visual object classifier training set with the photographs and correlated objects; in an embodiment, correlations may be further identified by matching locations of objects in a coordinate system mapped onto images to locations of geometric objects in a photograph, by receiving user identifications or "tags" of particular objects, or the like. A computing device may be configured to extract the plurality of content elements by extracting a plurality of geometric forms from a visual component of the media item and classify the plurality of geometric forms using the visual object classifier.

Still referring to FIG. 1, apparatus 100 may be configured to classify textual elements to objects using a linguistic object classifier; that is, an object classifier may include a linguistic object classifier. Textual elements may include words or phrases, as described in further detail below, extracted from textual data such as documents or the like. Textual elements may include other forms of data converted into textual data, such as without limitation textual data converted from audio data using speech-to-text algorithms and/or protocols, textual data extracted from images using optical character recognition (OCR), or the like. A linguistic object classifier may include any classifier described above; a linguistic object classifier may generate an output classifying an element of textual data to an object according to any classification algorithm as described above. In an embodiment, a computing device may train a linguistic object classifier using a linguistic classification training set, which may, as a non-limiting example, include elements of textual data and identifications of one or more objects associated therewith. Linguistic classification training set may, for instance, be populated by user entries of textual data along with corresponding user entries identifying and/labeling objects as described above. A computing device may be configured to extract the plurality of content elements by extracting a plurality of textual elements from a verbal component of the media item and classify the plurality of textual elements using a linguistic object classifier.

Still referring to FIG. 1, generation of linguistic classification training set, mapping of user entries to object labels, and/or classification of textual objects to labels may alternatively or additionally be performed using a language processing algorithm. A language processing algorithm may operate to produce a language processing model. A language processing model may include a program automatically generated by language processing algorithm to produce associations between one or more words and/or phrases, including without limitation mathematical associations, between such words. Associations between language elements, where language elements include for purposes herein extracted words and/or object labels, without limitation, mathematical associations, including without limitation statistical correlations between any language element and any other language element and/or language elements. Statistical correlations and/or mathematical associations may include probabilistic formulas or relationships indicating, for instance, a likelihood that a given word and/or phrase indicates a given object label and/or a given additional word and/or phrase. As a further example, statistical correlations and/or mathematical associations may include probabilistic formulas or relationships indicating a positive and/or negative association between at least a word and/or phrase and an object label and/or an additional word.

Still referring to FIG. 1, a language processing algorithm may generate a language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between at least a word and/or phrase and an object label and/or an additional word. There may be a finite number of labels, words and/or phrases, and/or relationships therebetween; an HMM inference algorithm, such as the forward-backward algorithm or the Viterbi algorithm, may be used to estimate the most likely discrete state given a word or sequence of words. Language processing algorithm may combine two or more approaches. For instance, and without limitation, machine-learning program may use a combination of Naive-Bayes, Stochastic Gradient Descent (SGD), and parameter grid-searching classification techniques; the result may include a classification algorithm that returns ranked associations.

Continuing to refer to FIG. 1, generating a language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, a language processing algorithm may use a corpus of documents to generate associations between language elements in a language processing algorithm, and a computing device may then use such associations to analyze words extracted from one or more documents and determine that the one or more documents indicate a given relationship between at least a word and/or phrase and an object label and/or an additional word. In an embodiment, a computing device may perform an analysis using a selected set of significant documents, such as documents identified by one or more users and/or expert users, and/or a generalized body of documents and/or co-occurrence data, which may be compiled by one or more third parties. Documents and/or co-occurrence data may be received by a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, a computing device may automatically obtain the documents, co-occurrence data, or the like by downloading and/or navigating to one or more centralized and/or distributed collections thereof. A computing device may alternatively or additionally receive any language processing model from one or more remote devices or third-party devices and utilize such language processing model as described above.

Still referring to FIG. 1, apparatus 100 may detect and/or intercept media using one or more programs and/or modules that can act to detect and/or redirect content that is being transmitted to a user device; such programs and/or modules may include, without limitation, web browsers provided to a user device, "plugins" or the like operating on web browsers on a user device, programs and/or modules installed at advertisement providers, content providers, social media platforms or the like, and/or programs that route network traffic through one or more servers operated by a computing device as a portal for network access for human subject's device. Persons skilled in the art, upon reviewing the entirety of this disclosure, will be aware of various additional or alternative ways in which a computing device may receive and/or detect media items within the scope of this disclosure.

With continued reference to FIG. 1, apparatus 100 may be configured to identify a principal theme of a received media item using a media theme classifier. Apparatus 100 may input a media item to a media theme classifier, which may output a principal theme, for instance by identifying a cluster, corresponding to a theme, which is most closely associated with a media item, as described above. In an embodiment, apparatus 100 may input a plurality of objects identified in the media item to a media theme classifier. For instance, and without limitation, a computing device may extract a plurality of content elements from a media item, where extraction may be performed in any manner described above. Apparatus 100 may classify each content element of plurality of content elements to an object of a plurality of objects using an object classifier, which may be any object classifier or collection of object classifiers as described above. Apparatus 100 may input plurality of objects to a media theme classifier.

Still referring to FIG. 1, apparatus 100 may generate an objective function. An "objective function" as used in this disclosure is a process of minimizing or maximizing one or more values based on a set of constraints. In some embodiments, an objective function of apparatus 100 may include an optimization criterion. An optimization criterion may include any description of a desired value or range of values for one or more attributes; desired value or range of values may include a maximal or minimal value, a range between maximal or minimal values, or an instruction to maximize or minimize an attribute. As a non-limiting example, an optimization criterion may specify that an attribute should be within a 1% difference of an attribute criterion. An optimization criterion may alternatively request that an attribute be greater than a certain value. An optimization criterion may specify one or more tolerances for precision in a matching of attributes to improvement thresholds. An optimization criterion may specify one or more desired attribute criteria for a matching process. In an embodiment, an optimization criterion may assign weights to different attributes or values associated with attributes. One or more weights may be expressions of value to a user of a particular outcome, attribute value, or other facet of a matching process. Optimization criteria may be combined in weighted or unweighted combinations into a function reflecting an overall outcome desired by a user; function may be an attribute function to be minimized and/or maximized. A function may be defined by reference to attribute criteria constraints and/or weighted aggregation thereof as provided by apparatus 100; for instance, an attribute function combining optimization criteria may seek to minimize or maximize a function of improvement threshold matching.

Still referring to FIG. 1, apparatus 100 may use an objective function to compare plurality of attributes 108 with improvement threshold 112. Generation of an objective function may include generation of a function to score and weight factors to achieve a process score for each feasible pairing. In some embodiments, pairings may be scored in a matrix for optimization, where columns represent attributes and rows represent matches potentially paired therewith; each cell of such a matrix may represent a score of a pairing of the corresponding attribute to the corresponding match. In some embodiments, assigning a predicted process that optimizes the objective function includes performing a greedy algorithm process. A "greedy algorithm" is defined as an algorithm that selects locally optimal choices, which may or may not generate a globally optimal solution. For instance, apparatus 100 may select pairings so that scores associated therewith are the best score for each improvement threshold and/or for each attribute. In such an example, optimization may determine the combination of attributes such that each attribute pairing includes the highest score possible.

Still referring to FIG. 1, an objective function may be formulated as a linear objective function. Apparatus 100 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all attributes r, S is a set of all improvement thresholds s, $c_{rs}$ is a score of a pairing of a given attribute with a given improvement threshold, and $x_{rs}$ is 1 if an attribute r is paired with a match s, and 0 otherwise. Continuing the example, constraints may specify that each attribute is assigned to only one match, and each match is assigned only one attribute. Matches may include matching processes as described above. Sets of attributes may be optimized for a maximum score combination of all generated attributes. In various embodiments, apparatus 104 may determine a combination of attributes that maximizes a total score subject to a constraint that all attributes are paired to exactly one match. Not all matches may receive an attribute pairing since each match may only produce one attribute pairing. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on apparatus 100, another device, and/or may be implemented on third-party solver.

With continued reference to FIG. 1, optimizing an objective function may include minimizing a loss function, where a "loss function" is an expression an output of which an optimization algorithm minimizes to generate an optimal result. As a non-limiting example, apparatus 100 may assign variables relating to a set of parameters, which may correspond to score attributes as described above, calculate an output of mathematical expression using the variables, and select a pairing that produces an output having the lowest size, according to a given definition of "size," of the set of outputs representing each of plurality of candidate improvement thresholds; size may, for instance, included absolute value, numerical size, or the like. Selection of different loss functions may result in identification of different potential pairings as generating minimal outputs. Objectives represented in an objective function and/or loss function may include minimization of differences between attributes and improvement thresholds.

Still referring to FIG. 1, apparatus 100 may determine attribute enhancement datum 116. Apparatus 100 may determine attribute enhancement datum 116 as a function of a comparison of plurality of attributes 108 to improvement threshold 112. An "attribute enhancement datum" as used in this disclosure is a metric pertaining to a step of improving an attribute. A step may include, but is not limited to, practicing one or more skills, completing one or more examinations, reading one or more pieces of literature, and the like. For instance and without limitation, attribute enhancement datum 116 may include completing astrophysics quizzes. In some embodiments, apparatus 100 may determine attribute enhancement datum 116 through querying the Internet for similar attributes of plurality of attributes 108, similar data of user data 104, and the like. Apparatus 100 may divide attribute enhancement datum 116 into one or more subdivision that may correspond to advancements of an attribute of plurality of attributes 108. "Subdivisions" as used in this disclosure are parts of a whole element. Subdivisions may include, but are not limited to, fractions, percentages, and the like. Advancements of an attribute may include, without limitation, increased attribute proficiency. In some embodiments, apparatus 100 may determine advancements of an attribute of plurality of attributes 108 as a function of user data received in response to attribute enhancement datum 116. For instance and without limitation, attribute enhancement datum 116 may include learning the Cyrillic alphabet. User data 104 may include a slight increase in knowledge of the Cyrillic alphabet. Apparatus 100 may determine a mild advancement of an attribute of plurality of attributes 108. In some embodiments, apparatus 100 may sort advancements of one or more attributes into subdivisions. For instance and without limitation, apparatus 100 may divide an attribute of Russian literacy into beginner, intermediate, and/or advanced subdivisions. Apparatus 100 may determine attribute enhancement datum 116 as a function of one or more subdivisions of an attribute of plurality of attributes 108. In some embodiments, apparatus 100 may utilize an attribute machine learning model. An attribute machine learning model may be trained with training data correlating improvement thresholds and/or user data to attribute enhancement data. Training data may be received from user input, external computing devices, and/or previous iterations of processing. In some embodiments, an attribute machine learning model may be configured to input user data 104 and/or improvement threshold 112 and output one or more attribute enhancement data 116.

Still referring to FIG. 1, in some embodiments, apparatus 100 may be configured to determine a first category of an attribute of plurality of attributes 108. A first category may include, but is not limited to, writing skills, speaking skills, math skills, time management skills, and the like. Apparatus 100 may determine one or more related categories that an attribute of a first category may be applicable to. For instance and without limitation, apparatus 100 may determine an attribute of writing skills may be applicable to learning a second language. Apparatus 100 may generate a query for a compatible second category of an attribute of a plurality of attributes 108. A compatible category may include an attribute classification that has one or more degrees of similarity to a first attribute category. Apparatus 100 may use any machine learning model classifier, and/or other process to determine a compatible category of a first attribute category. Apparatus 100 may match an attribute of a plurality of attributes 108 to a second attribute category. For instance and without limitation, a first attribute category may include organizational skills, and a second attribute category may include project planning. Apparatus 100 may match an attribute of plurality of attributes 108 of organizational skills to a second attribute category of project planning.

Still referring to FIG. 1, apparatus 100 may receive user data 104 and update attribute enhancement datum 116 as a function of user data 104. Updating attribute enhancement datum 116 may include, without limitation, changing an intensity, duration, frequency, category, and the like of attribute enhancement datum 116. For instance and without limitation, updating attribute enhancement datum 116 may include adding additional Russian literature passages for a user to read. In some embodiments, apparatus 100 may be configured to prioritize an attribute of plurality of attributes 108 as a function of an advancement target. An "advancement target" as used in this disclosure is a level of progress. In some embodiments, an advancement target may be received through user input. In other embodiments, apparatus 100 may determine an advancement target, such as, without limitation, as a function of improvement threshold 112. In some embodiments, apparatus 100 may generate improvement threshold 112 as a function of a cohort of user data. A cohort of user data may be provided to apparatus 100 and/or extracted from one or more databases. In some embodiments, a cohort of user data may include multiple users. Apparatus 100 may use a cohort of user data to determine a baseline proficiency and compare an attribute of plurality of attributes 108 to the baseline proficiency.

Still referring to FIG. 1, apparatus 100 may generate presentation 120. A "presentation" as used in this disclosure is a showing of data. Presentation 120 may include a displaying of user data 104, plurality of attributes 108, improvement threshold 112, attribute enhancement datum 116, and/or other data. Presentation 120 may include a graphical user interface (GUI). In some embodiments, apparatus 100 may communicate presentation 120 to a display of a user device, such as, without limitation, a smartphone, laptop, tablet, and/or other device.

Still referring to FIG. 1, in an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Still referring to FIG. 1, in some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 1, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

With continued reference to FIG. 1, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 1, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 1, a "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still referring to FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Figure 2:
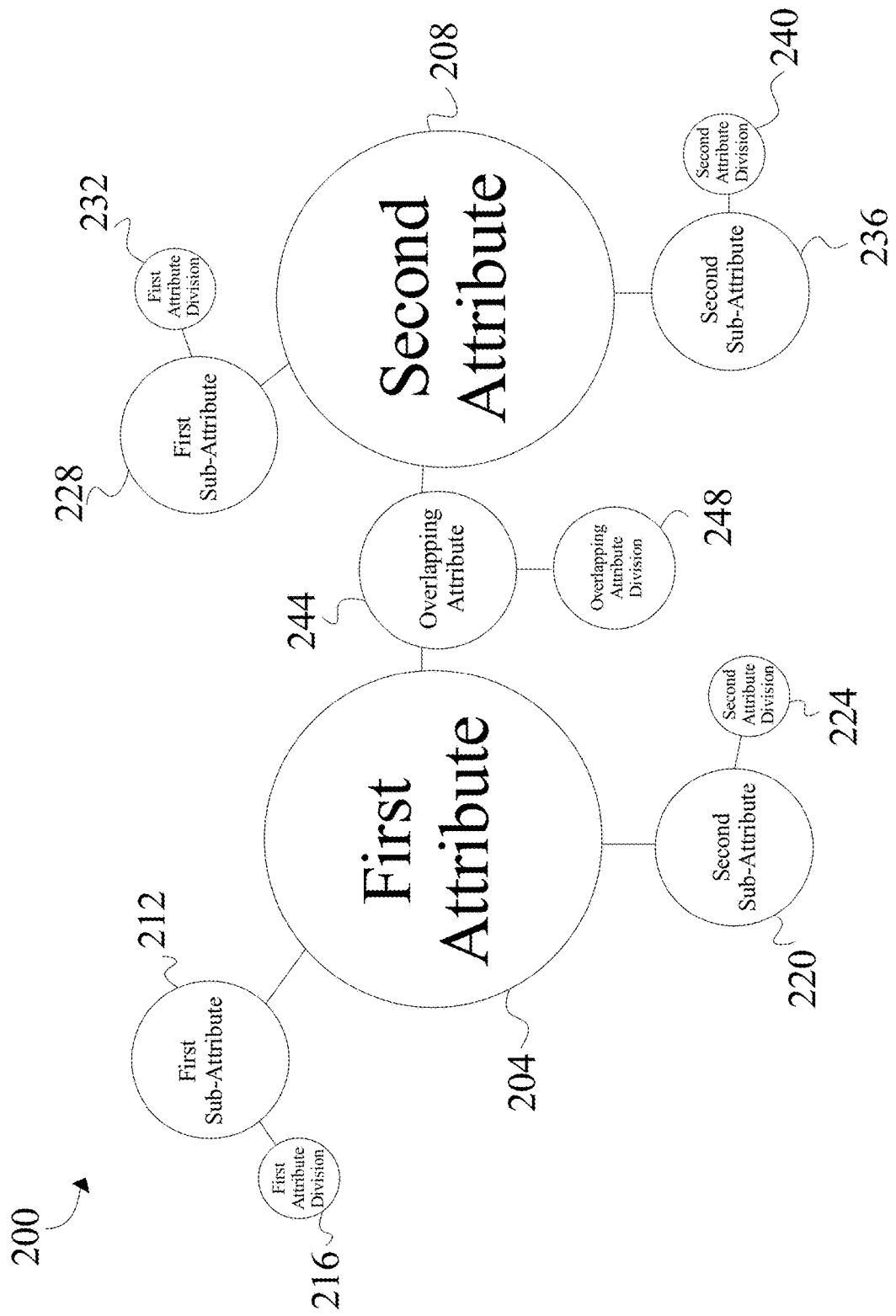
FIG. 2 is an exemplary embodiment of an attribute traversal tree.

Referring now to FIG. 2, an exemplary embodiment of an attribute traversal tree 200 is presented. Attribute traversal tree 200 may include first attribute 204. A "first attribute" as used in this disclosure is an initial attribute. First attribute 204 may include attributes as described above with reference to FIG. 1. In some embodiments, first attribute 204 may be generated by apparatus 100 and/or utility function 132. In other embodiments, first attribute 204 may be determined through user input at apparatus 100. First attribute 204 may include, but is not limited to, speaking skills, writing skills, reading skills, math skills, technical skills, coding skills, athletic skills, and the like. In some embodiments, attribute traversal tree 200 may include first sub-attribute 212. A "first sub-attribute" as used in this disclosure is an initial part of a larger attribute. First sub-attribute 212 may include, but is not limited to, enunciation skills, pronunciation skills, calculus skills, and/or other skills. In some embodiments, first sub-attribute 212 may correspond to first attribute 204. For instance and without limitation, first attribute 204 may include aerospace engineering and first sub-attribute 212 of first attribute 204 may include physics skills. In some embodiments, first sub-attribute 212 of first attribute 204 may include first attribute division 216. A "first attribute division" as used in this disclosure is a portion of a sub-attribute. A portion of a sub-attribute may include one or more skills of an attribute. First attribute division 216 may include, but is not limited to, calculus skills, grammar skills, eye-hand coordination skills, logical reasoning skills, and the like. First attribute division 216 may correspond to first sub-attribute 212. For instance and without limitation, first attribute 204 may include aerospace engineering, first sub-attribute 212 may include physics skills, and first attribute division 216 may include calculus skills. First attribute 204 may include second sub-attribute 220 and/or second attribute division 224. A "second sub-attribute" as used in this disclosure is a sub-attribute differing from a first sub-attribute. A "second attribute division" as used in this disclosure is a portion of a second sub-attribute. For instance and without limitation, first attribute 204 may include coding skills. First sub-attribute 212 may include logical math skills, and first attribute division 216 may include logical reasoning skills. Continuing this example, second sub-attribute 220 of first attribute 204 may include researching skills, and second attribute division 224 may include typing skills.

Still referring to FIG. 2, in some embodiments, attribute traversal skill may include second attribute 208. A "second attribute" as used in this disclosure is an attribute differing from an initial attribute. Second attribute 208 may include attributes as described above with reference to FIG. 1. In some embodiments, attribute traversal tree 200 may include first attribute 228, first attribute division 232, second sub-attribute 236, and second attribute division 240 which may originate from second attribute 208. For instance and without limitation, second attribute 208 may include football skills, first sub-attribute 228 may include running skills, and first attribute division 232 may include footwork skills. Continuing this example, second sub-attribute 236 of second attribute 208 may include catching skills and second attribute division 240 may include eye-hand coordination skills.

Still referring to FIG. 2, in some embodiments, attribute traversal tree may include overlapping attribute 244. An "overlapping attribute" as used in this disclosure is an attribute that is categorized into at least two attribute categories. Overlapping attribute 244 may include, but is not limited to, math skills, reading skills, communication skills, athletic skills, and the like. In some embodiments, apparatus 100 may determine overlapping attribute 244 based on first attribute 204 and/or second attribute 208. For instance and without limitation, first attribute 204 may include electrical engineering skills and second attribute 208 may include computer science skills. Overlapping attribute 204 may include math skills. In some embodiments, attribute traversal tree may include overlapping attribute division 248. An "overlapping attribute division" as used in this disclosure is a portion of an overlapping attribute. Overlapping attribute division 248 may include, but is not limited to, math skills, physics skills, writing skills, and the like. For instance and without limitation, overlapping attribute 244 may include public speaking skills and overlapping attribute division 248 may include enunciation skills.

Figure 3:
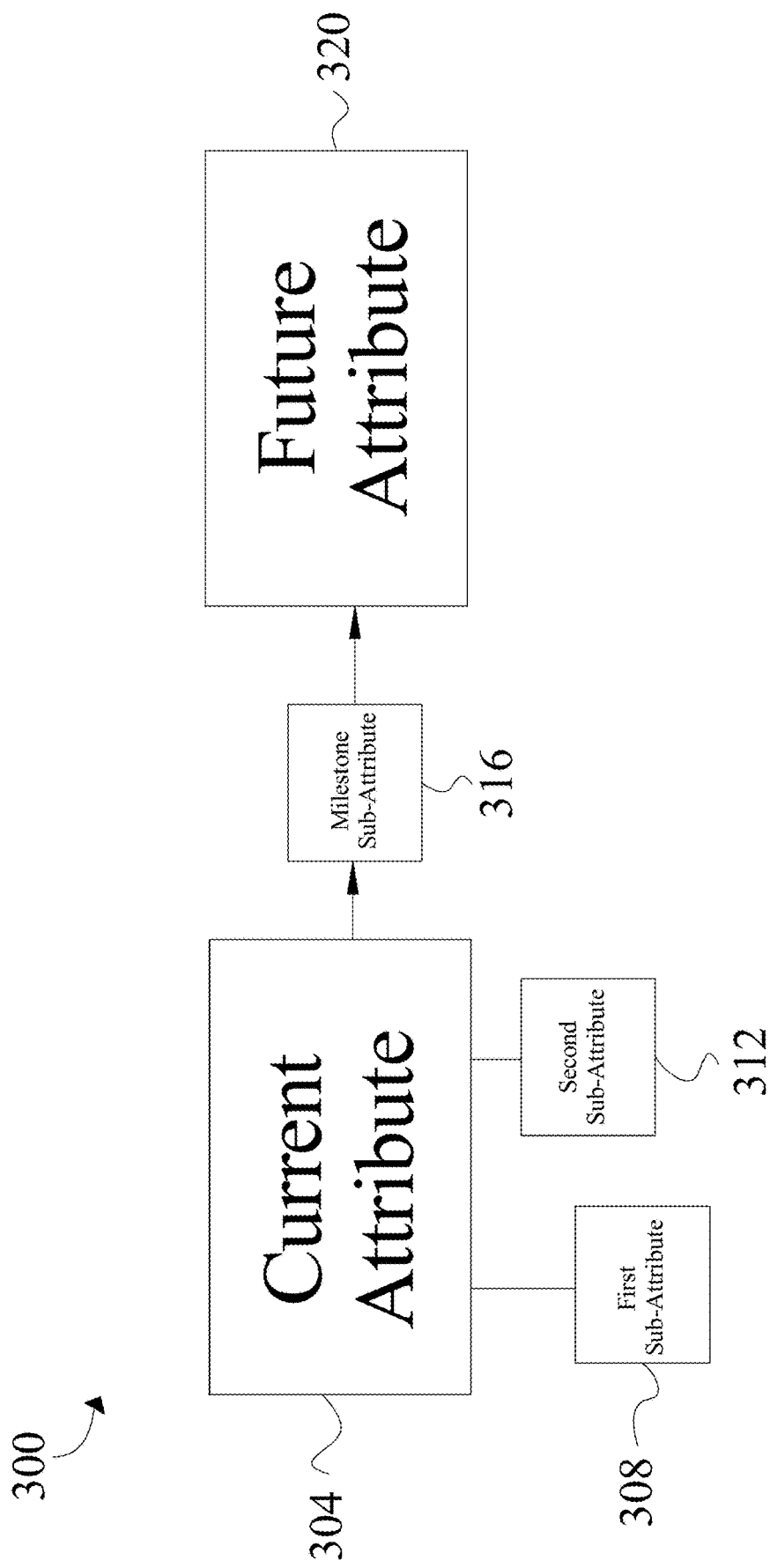
FIG. 3 is an exemplary embodiment of attribute traversal.

Referring now to FIG. 3, an exemplary embodiment of attribute traversal 300 is presented. Attribute traversal 300 may include current attribute 304. A "current attribute" as used in this disclosure is a skill and/or ability of an individual in the present. Current attribute 304 may include any attribute as described throughout this disclosure, without limitation. In some embodiments, current attribute 304 may include first sub-attribute 308. First sub-attribute 308 may include any sub-attribute as described throughout this disclosures. Current attribute 304 may include second sub-attribute 312. Second sub-attribute 312 may include any sub-attribute as described throughout this disclosure. For instance and without limitation, current attribute 304 may include social skills, first sub-attribute 308 may include listening skills, and second sub-attribute 312 may include speaking skills.

Still referring to FIG. 3, attribute traversal 300 may include milestone sub-attribute 316. A "milestone sub-attribute" as used in this disclosure is a checkpoint skill that indicates increased proficiency from a baseline proficiency level. Milestone sub-attribute 316 may include, but is not limited to, proficiency in writing, math, speaking, coding, running, circuit board construction, and the like. In some embodiments, attribute traversal 300 may include future attribute 320. A "future attribute" as used in this disclosure is a skill and/or ability of a certain proficiency level. Future attribute 320 may include, but is not limited to, average, excellent, and/or superior proficiency scores of one or more attributes such as calculus, coding, writing, and the like. Milestone sub-attribute 316 may be generated based on current attribute 304 and/or future attribute 320. For instance and without limitation, current attribute 304 may include speaking skills and future attribute 320 may include teaching skills. Continuing this example, milestone sub-attribute 316 may include technical skills such as, but not limited to, math skills, history knowledge, science knowledge, English proficiency, and the like.

Figure 4:
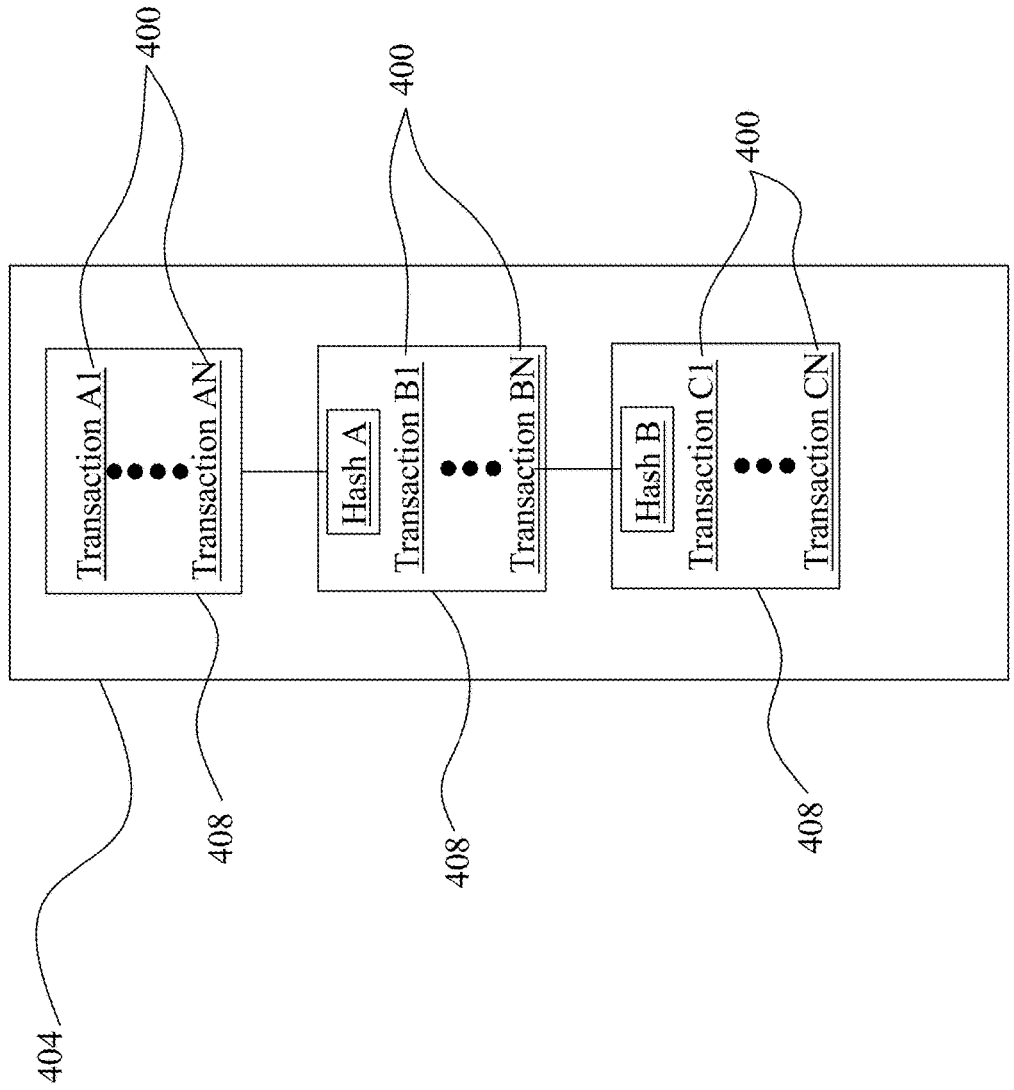
FIG. 4 is an exemplary embodiment of an immutable sequential listing.

Referring now to FIG. 4, an exemplary embodiment of an immutable sequential listing 400 is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. Data elements are listing in immutable sequential listing 400; data elements may include any form of data, including textual data, image data, encrypted data, cryptographically hashed data, and the like. Data elements may include, without limitation, one or more at least a digitally signed assertions. In one embodiment, a digitally signed assertion 404 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 404. In an embodiment, collection of textual data states that the owner of a certain transferable item represented in a digitally signed assertion 404 register is transferring that item to the owner of an address. A digitally signed assertion 404 may be signed by a digital signature created using the private key associated with the owner's public key, as described above.

Still referring to FIG. 4, a digitally signed assertion 404 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 404 may describe the transfer of a physical good; for instance, a digitally signed assertion 404 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 404 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 4, in one embodiment, an address is a textual datum identifying the recipient of virtual currency or another item of value in a digitally signed assertion 404. In some embodiments, address is linked to a public key, the corresponding private key of which is owned by the recipient of a digitally signed assertion 404. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 404 may record a subsequent a digitally signed assertion 404 transferring some or all of the value transferred in the first a digitally signed assertion 404 to a new address in the same manner. A digitally signed assertion 404 may contain textual information that is not a transfer of some item of value in addition to, or as an alternative to, such a transfer. For instance, as described in further detail below, a digitally signed assertion 404 may indicate a confidence level associated with a distributed storage node as described in further detail below.

In an embodiment, and still referring to FIG. 4 immutable sequential listing 400 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 400 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 4, immutable sequential listing 400 may preserve the order in which the at least a posted content took place by listing them in chronological order; alternatively or additionally, immutable sequential listing 400 may organize digitally signed assertions 404 into sub-listings 408 such as "blocks" in a blockchain, which may be themselves collected in a temporally sequential order; digitally signed assertions 404 within a sub-listing 408 may or may not be temporally sequential. The ledger may preserve the order in which at least a posted content took place by listing them in sub-listings 408 and placing the sub-listings 408 in chronological order. The immutable sequential listing 400 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 400 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 4, immutable sequential listing 400, once formed, may be inalterable by any party, no matter what access rights that party possesses. For instance, immutable sequential listing 400 may include a hash chain, in which data is added during a successive hashing process to ensure non-repudiation. Immutable sequential listing 400 may include a block chain. In one embodiment, a block chain is immutable sequential listing 400 that records one or more new at least a posted content in a data item known as a sub-listing 408 or "block."

An example of a block chain is the BITCOIN block chain used to record BITCOIN transactions and values. Sub-listings 408 may be created in a way that places the sub-listings 408 in chronological order and link each sub-listing 408 to a previous sub-listing 408 in the chronological order so that any computing device may traverse the sub-listings 408 in reverse chronological order to verify any at least a posted content listed in the block chain. Each new sub-listing 408 may be required to contain a cryptographic hash describing the previous sub-listing 408. In some embodiments, the block chain contains a single first sub-listing 408 sometimes known as a "genesis block."

Still referring to FIG. 4, the creation of a new sub-listing 408 may be computationally expensive; for instance, the creation of a new sub-listing 408 may be designed by a "proof of work" protocol accepted by all participants in forming the immutable sequential listing 400 to take a powerful set of computing devices a certain period of time to produce. Where one sub-listing 408 takes less time for a given set of computing devices to produce the sub-listing 408 protocol may adjust the algorithm to produce the next sub-listing 408 so that it will require more steps; where one sub-listing 408 takes more time for a given set of computing devices to produce the sub-listing 408 protocol may adjust the algorithm to produce the next sub-listing 408 so that it will require fewer steps. As an example, protocol may require a new sub-listing 408 to contain a cryptographic hash describing its contents; the cryptographic hash may be required to satisfy a mathematical condition, achieved by having the sub-listing 408 contain a number, called a nonce, whose value is determined after the fact by the discovery of the hash that satisfies the mathematical condition. Continuing the example, the protocol may be able to adjust the mathematical condition so that the discovery of the hash describing a sub-listing 408 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 408 according to the protocol is known as "mining." The creation of a new sub-listing 408 may be designed by a "proof of stake" protocol as will be apparent to those skilled in the art upon reviewing the entirety of this disclosure.

Continuing to refer to FIG. 4, in some embodiments, protocol also creates an incentive to mine new sub-listings 408. The incentive may be financial; for instance, successfully mining a new sub-listing 408 may result in the person or entity that mines the sub-listing 408 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 408 Each sub-listing 408 created in immutable sequential listing 400 may contain a record or at least a posted content describing one or more addresses that receive an incentive, such as virtual currency, as the result of successfully mining the sub-listing 408.

With continued reference to FIG. 4, where two entities simultaneously create new sub-listings 408, immutable sequential listing 400 may develop a fork; protocol may determine which of the two alternate branches in the fork is the valid new portion of the immutable sequential listing 400 by evaluating, after a certain amount of time has passed, which branch is longer. "Length" may be measured according to the number of sub-listings 408 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 408 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 400 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 400.

Still referring to FIG. 4, additional data linked to at least a posted content may be incorporated in sub-listings 408 in the immutable sequential listing 400; for instance, data may be incorporated in one or more fields recognized by block chain protocols that permit a person or computer forming a at least a posted content to insert additional data in the immutable sequential listing 400. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 4, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 408 in a block chain computationally challenging; the incentive for producing sub-listings 408 may include the grant of new crypto-currency to the miners. Quantities of crypto-currency may be exchanged using at least a posted content as described above.

Still referring to FIG. 4, in some embodiments, apparatus 100 may store user data 104, plurality of attributes 108, attribute enhancement datum 116, and/or other data, without limitation, in immutable sequential listing 400. In some embodiments, apparatus 100 may store one or more advancements of an attribute proficiency in immutable sequential listing 400. Apparatus 100 may utilize immutable sequential listing 400 to store and/or verify any data as used throughout this disclosure, without limitation.

Figure 5:
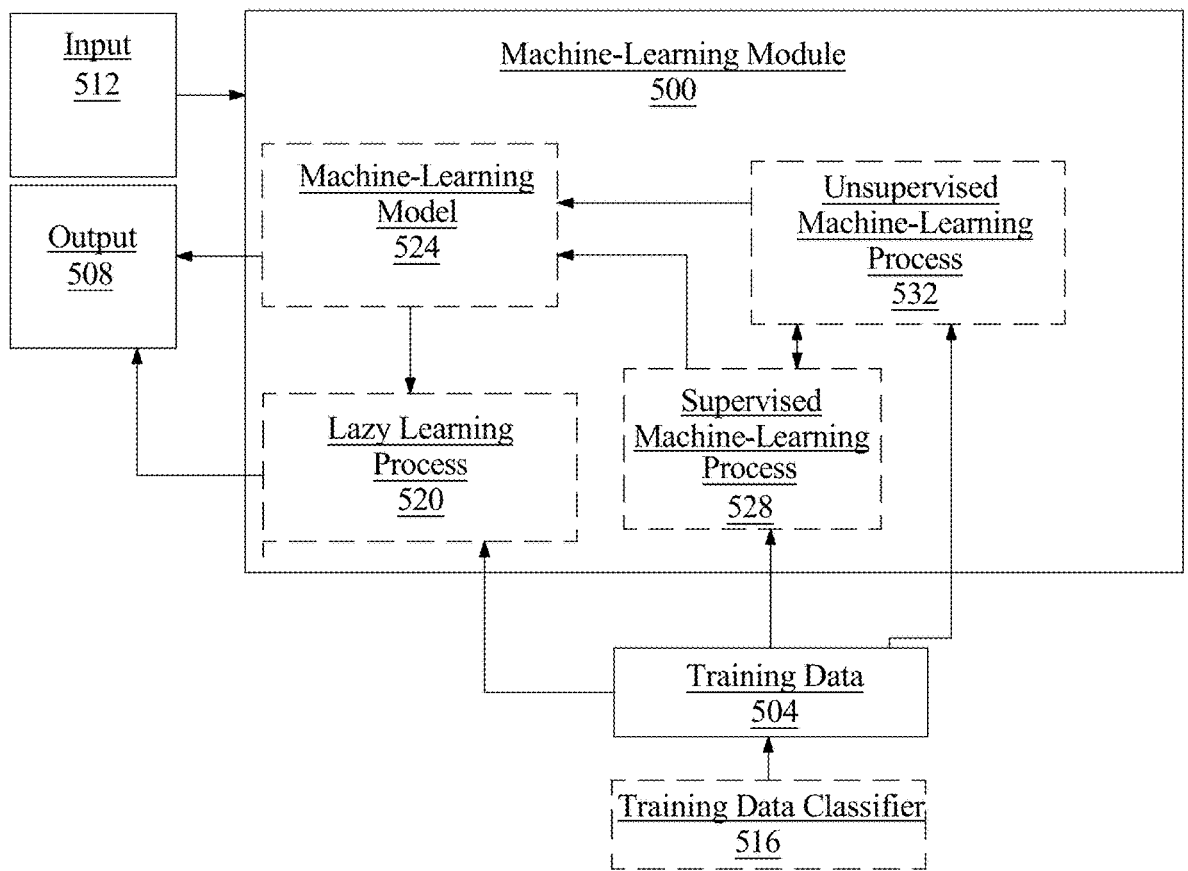
FIG. 5 a block diagram of a machine learning model.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example input data may include attributes and output data may include attribute enhancement data.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to categories of attributes.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include attribute data tables as described above as inputs, matching improvement thresholds as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
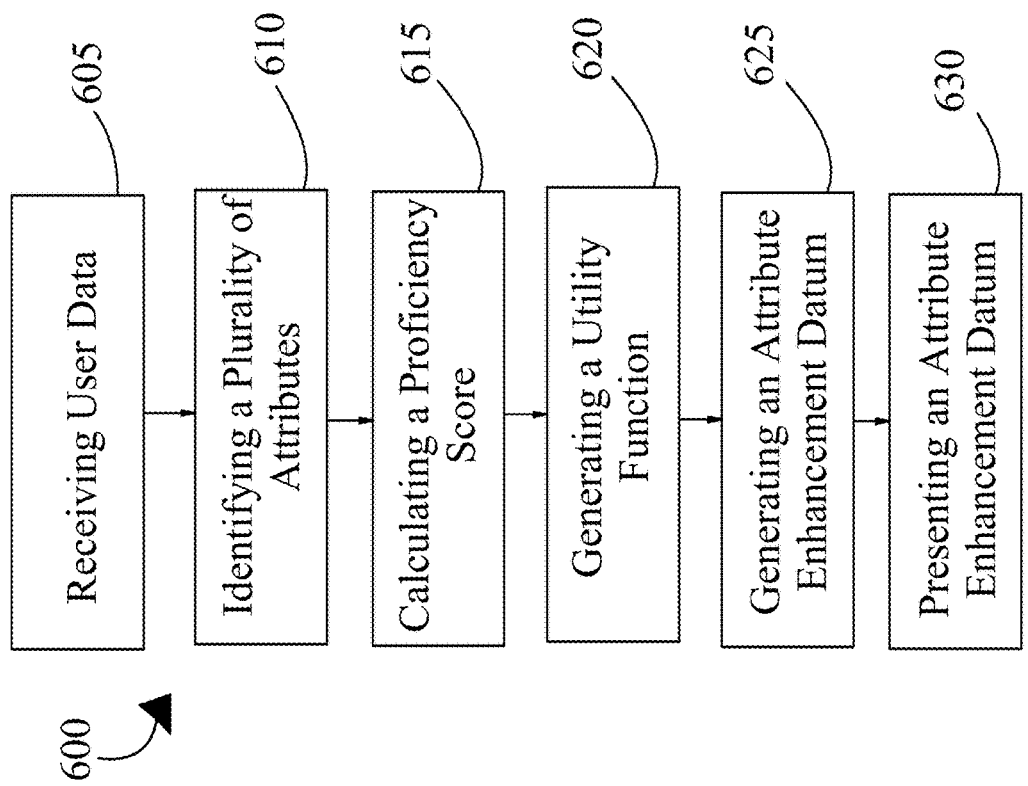
FIG. 6 is flowchart of a method of attribute traversal.

Referring now to FIG. 6, a method 600 of attribute traversal is presented. At step 605, method 600 includes receiving user data. User data may be received through one or more sensors, user input, and the like. This step may be implemented without limitation as described in FIGS. 1-5.

Still referring to FIG. 6, at step 610, method 600 includes identifying a plurality of attributes. A plurality of attributes may be identified as a function of user data. This step may be implemented without limitation as described in FIGS. 1-5.

Still referring to FIG. 6, at step 615, method 600 includes calculating a proficiency score. This step may be implemented without limitation as described in FIGS. 1-5.

Still referring to FIG. 6, at step 620, method 600 includes generating a utility function. This step may be implemented without limitation as described in FIGS. 1-5.

Still referring to FIG. 6, at step 625, method 600 includes generating an attribute enhancement datum. This step may be implemented without limitation as described in FIGS. 1-5.

Still referring to FIG. 6, at step 630, method 600 includes presenting an attribute enhancement datum. This step may be implemented without limitation as described in FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
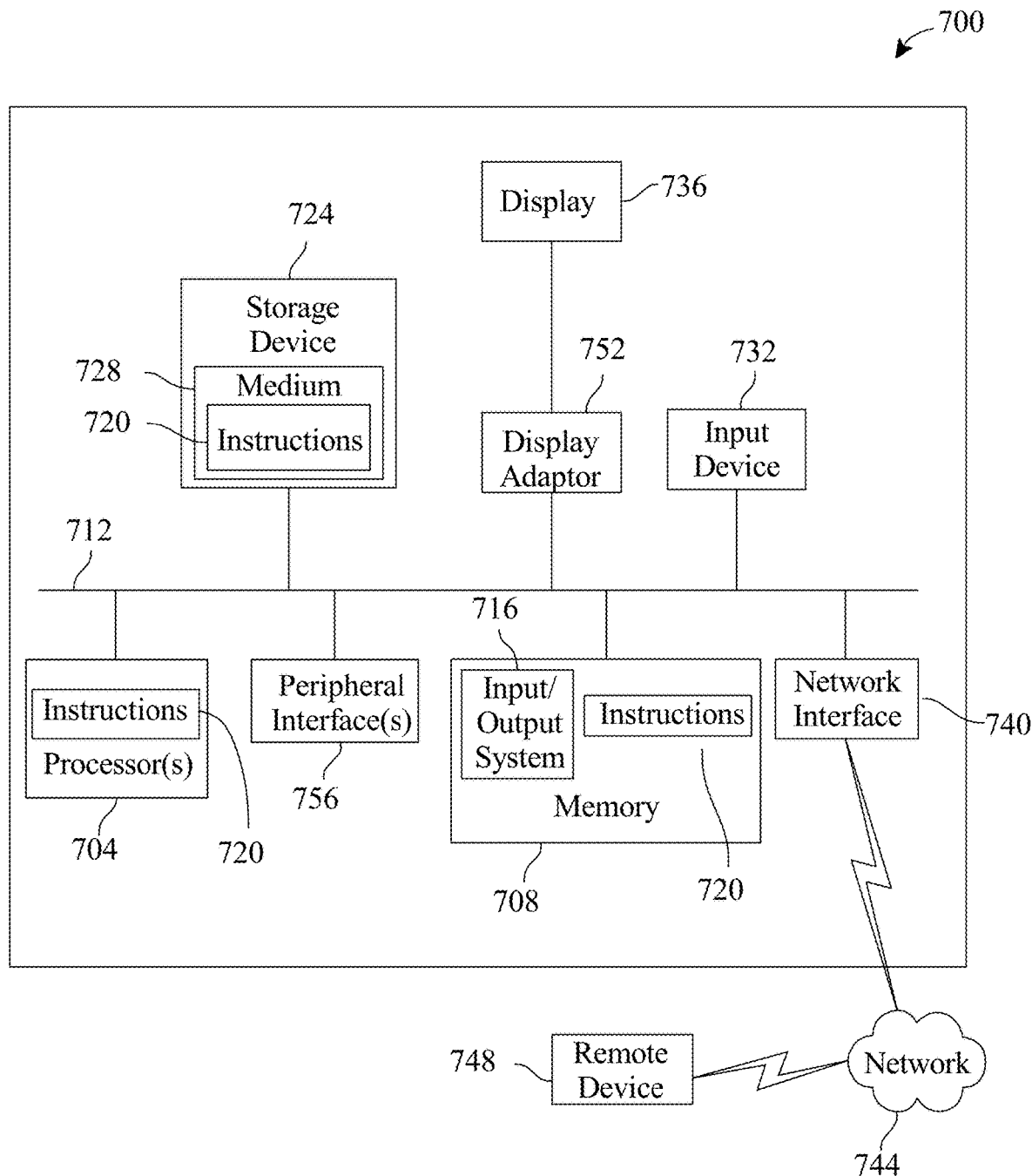
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Still referring to FIG. 7, processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 7, memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Still referring to FIG. 7, computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Still referring to FIG. 7, computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

Still referring to FIG. 7, a user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Still referring to FIG. 7, computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses, methods, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for attribute traversal, the apparatus comprising:
   at least a processor; and
   a memory communicatively connected to the at least a processor, the memory containing instructions configuring the at least a processor to:
      receive user data through a sensor in communication with the at least a processor;
      identify a plurality of attributes of the user data through an attribute classifier;
      calculate a proficiency score of at least an attribute of the plurality of attributes;
      generate a utility function based on the plurality of attributes and the proficiency score, wherein the utility function comprises at least a set of weighted parameters;
      generate an attribute enhancement datum based on the utility function, wherein the attribute enhancement datum is stored on an immutable sequential listing;
      generate an improvement threshold using a feature learning algorithm; and
      present the attribute enhancement datum and the improvement threshold to a user.

2. The apparatus of claim 1, wherein the at least a processor is further configured to rank the attributes of the plurality of attributes as a function of a ranking criterion.

3. The apparatus of claim 1, wherein the at least a processor is further configured to divide the attribute enhancement datum into subdivisions that correspond to advancements of the attribute of the plurality of attributes.

4. The apparatus of claim 1, wherein the at least a processor is further configured to compare the at least an attribute to the improvement threshold.

5. The apparatus of claim 1, wherein the at least a processor is further configured to:
   determine a first category of the attribute of the plurality of attributes;
   generate a query for a compatible second category of the attribute of the plurality of attributes; and
   match the attribute of the plurality of attributes to the compatible second category.

6. The apparatus of claim 1, wherein the at least a processor is further configured to prioritize an attribute of the plurality of attributes as a function of an advancement target.

7. The apparatus of claim 1, wherein the at least a processor is further configured to generate a baseline proficiency score as a function of an identification of a cohort of user data.

8. The apparatus of claim 1, wherein the at least a processor is further configured to:
   determine an advancement rate of an attribute of the plurality of attributes as a function of the user data; and
   modify the attribute enhancement datum as a function of the advancement rate.

9. The apparatus of claim 1, wherein the at least a processor is further configured to:
   generate a web index query; and
   determine the attribute enhancement datum as a function of results of the web index query.

10. The apparatus of claim 1, wherein the at least a processor is further configured to:
    receive training data correlating attribute data to attribute enhancement data;
    train an attribute machine learning model with the training data; and
    determine the attribute enhancement datum as a function of the attribute machine learning model.

11. A method of attribute traversal using a computing device, comprising:
    receiving user data through a sensor in communication with the computing device;
    identifying a plurality of attributes of the user data through an attribute classifier;
    calculating a proficiency score of at least an attribute of the plurality of attributes;
    generating a utility function based on the plurality of attributes and the proficiency score, wherein the utility function comprises at least a set of weighted parameters;
    generating an attribute enhancement datum as a based on the utility function, wherein the attribute enhancement datum is stored on an immutable sequential listing;
    generating an improvement threshold using a feature learning algorithm; and
    presenting the attribute enhancement datum to a user.

12. The method of claim 11, further comprising ranking the attributes of the plurality of attributes as a function of a ranking criterion.

13. The method of claim 11, further comprising dividing the attribute enhancement datum into subdivisions that correspond to advancements of the attribute of the plurality of attributes.

14. The method of claim 11, further comprising comparing the at least an attribute of the plurality of attributes to the improvement threshold.

15. The method of claim 11, further comprising:
    determining a first classification of the attribute of the plurality of attributes;
    generating a query for a compatible second classification of the attribute of the plurality of attributes; and
    matching the attribute of the plurality of attributes to the compatible second classification.

16. The method of claim 11, further comprising prioritizing an attribute of the plurality of attributes as a function of an advancement target.

17. The method of claim 11, further comprising generating a baseline proficiency score as a function of an identification of a cohort of user data.

18. The method of claim 11, further comprising:
   determining an advancement rate of an attribute of the plurality of attributes as a function of the user data; and
   modifying the attribute enhancement datum as a function of the advancement rate.

19. The method of claim 11, further comprising:
   generating a web index query; and
   determining the attribute enhancement datum as a function of results of the web index query.

20. The method of claim 11, further comprising:
   receiving training data correlating attribute data to attribute enhancement data;
   training an attribute machine learning model with the training data; and
   determining the attribute enhancement datum as a function of the attribute machine learning model.

* * * * *